March 17, 1953 A. A. MUEHLING 2,631,508
WEB PLEATING AND CUTTING MACHINE
Filed Sept. 24, 1948 10 Sheets-Sheet 1

INVENTOR.
ANTHONY A. MUEHLING
BY
*M. A. Hobbs*
ATTORNEY

INVENTOR.
ANTHONY A. MUEHLING
ATTORNEY

March 17, 1953     A. A. MUEHLING     2,631,508
WEB PLEATING AND CUTTING MACHINE
Filed Sept. 24, 1948     10 Sheets-Sheet 5

INVENTOR.
ANTHONY A. MUEHLING
BY
ATTORNEY

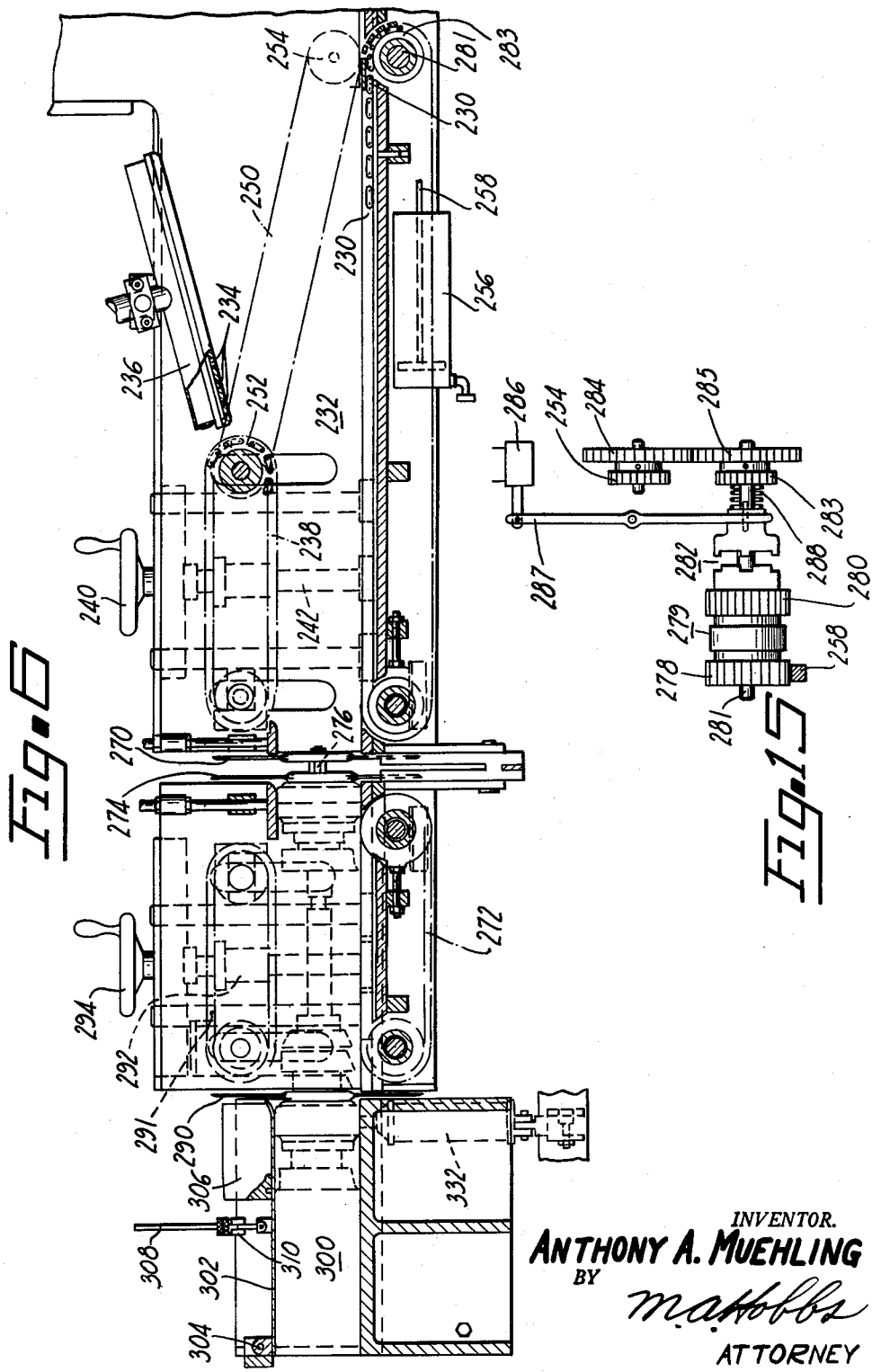

March 17, 1953 A. A. MUEHLING 2,631,508
WEB PLEATING AND CUTTING MACHINE
Filed Sept. 24, 1948 10 Sheets-Sheet 7
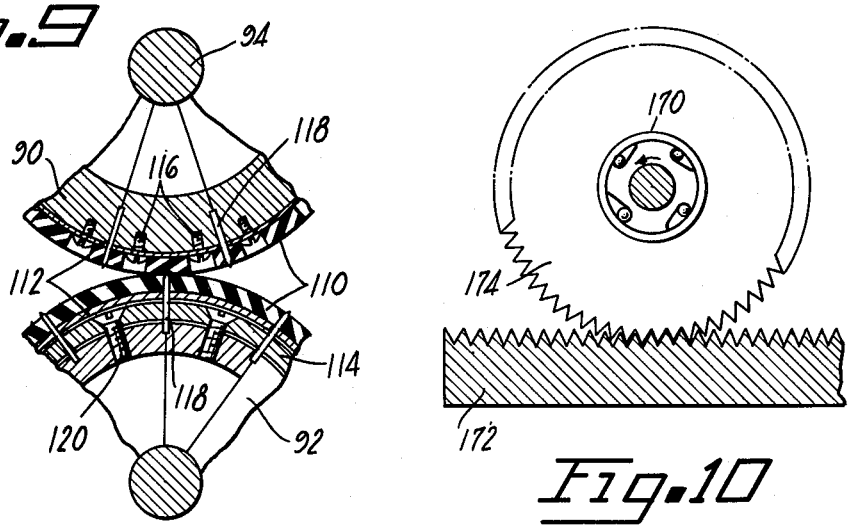
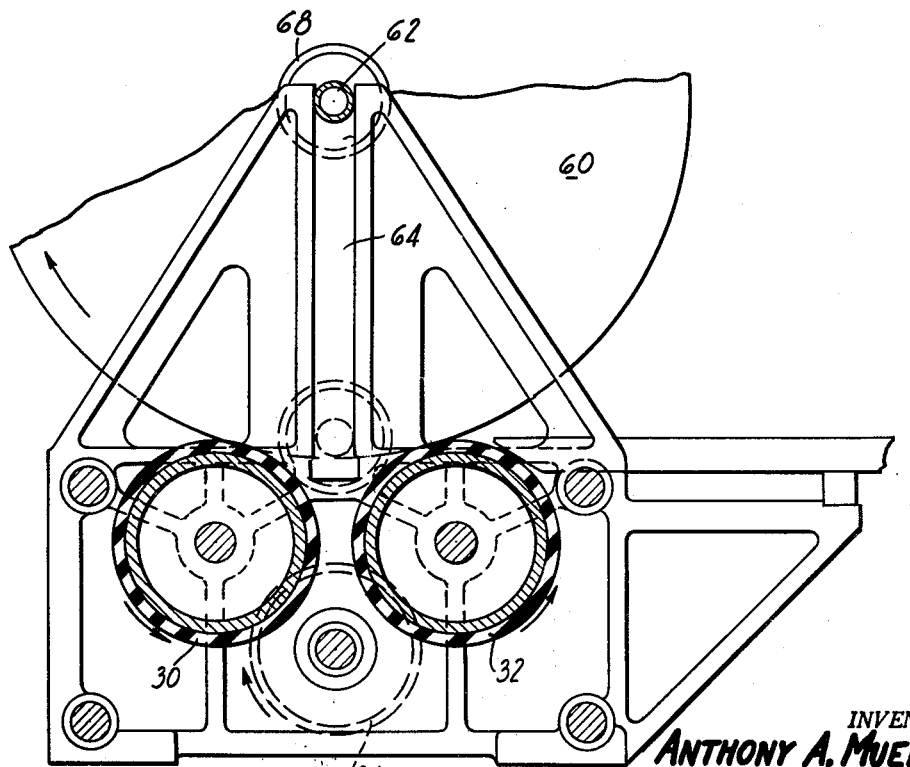
INVENTOR.
ANTHONY A. MUEHLING
BY
ATTORNEY March 17, 1953 — A. A. MUEHLING — 2,631,508
WEB PLEATING AND CUTTING MACHINE
Filed Sept. 24, 1948 — 10 Sheets-Sheet 8

INVENTOR.
ANTHONY A. MUEHLING
BY
m a Hobbs
ATTORNEY

March 17, 1953 — A. A. MUEHLING — 2,631,508
WEB PLEATING AND CUTTING MACHINE
Filed Sept. 24, 1948 — 10 Sheets-Sheet 9

INVENTOR.
ANTHONY A. MUEHLING
BY
ATTORNEY

March 17, 1953     A. A. MUEHLING     2,631,508
WEB PLEATING AND CUTTING MACHINE
Filed Sept. 24, 1948     10 Sheets-Sheet 10
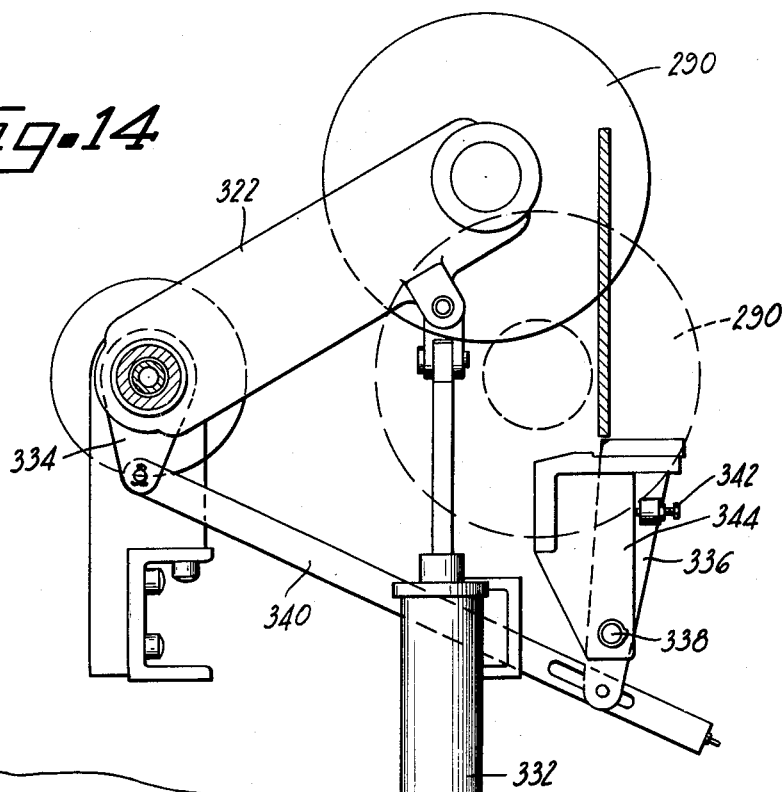
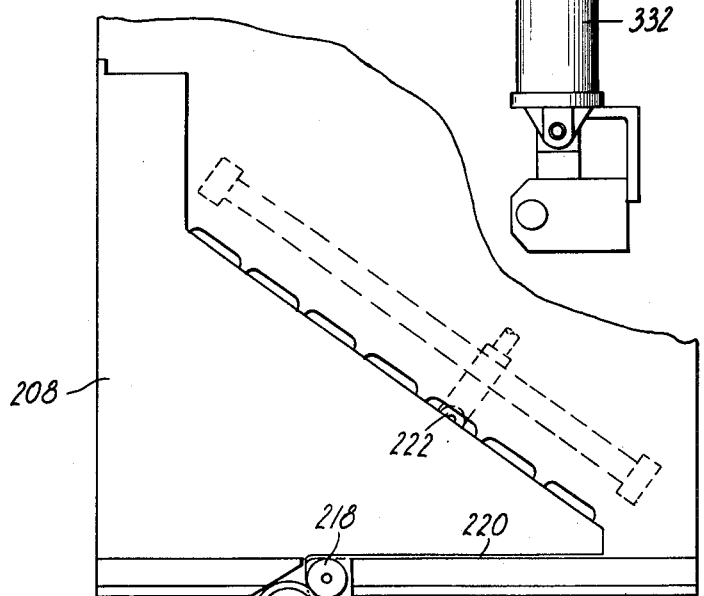
INVENTOR.
ANTHONY A. MUEHLING
BY
ATTORNEY Patented Mar. 17, 1953

2,631,508

UNITED STATES PATENT OFFICE 2,631,508

WEB PLEATING AND CUTTING MACHINE

Anthony A. Muehling, Detroit, Mich., assignor to Bendix Aviation Corporation, South Bend, Ind., a corporation of Delaware Application September 24, 1948, Serial No. 51,101

16 Claims. (Cl. 93—1)

The present invention relates to a machine for fabricating articles from sheet material, and more particularly to a machine for pleating and cutting sheet material and forming articles therefrom.

One of the principal objects of the present invention is to provide a means for pleating sheet material having numerous transverse rugosities without altering the character of said rugosities of the material being pleated.

Another object of the present invention is to provide a material pleating and cutting machine wherein the material is first pleated and the pleated material cut into predetermined lengths having a constant number of pleats.

Another object is to provide a material pleating and cutting and article forming machine wherein the sheet material is pleated, cut into predetermined lengths and the ends of said lengths are joined together to form hollow articles having longitudinally pleated walls.

Still another object of the invention is to provide a machine for pleating sheet material, cutting the pleated material into lengths, forming hollow elements from said lengths, and trimming the two ends of said elements.

Another object is to provide a machine for forming hollow cylindrically shaped filter elements with pleated side walls from sheet material having a predetermined rugosity, the rugosity of said material remaining substantially unchanged throughout the complete fabricating operation.

Another object of the invention is to provide a machine for forming from sheet material, such as paper, hollow fluid filter elements having pleated side walls.

Additional objects and advantages of my invention will be apparent from the following description and accompanying drawings, wherein:

Figure 6 is a sectional view through a portion of the article forming and trimming mechanisms shown in Figure 2;

Figure 7 is a sectional view of a reel for holding a coil of material from which the pleated articles are made;

Figure 9 is a section through the mechanism used in creasing the material as a step in the pleating operation;

Figure 10 is a partial section of the drive for a pleat counting and material cutting mechanism;

Figure 13 is another view of the forming mechanism shown in Figure 12;

Figure 14 is a detailed view of the article trimming mechanism; and

Figure 15 is a detailed view of the driving mechanism for the conveyors of the trimming mechanism.

Figure 1:
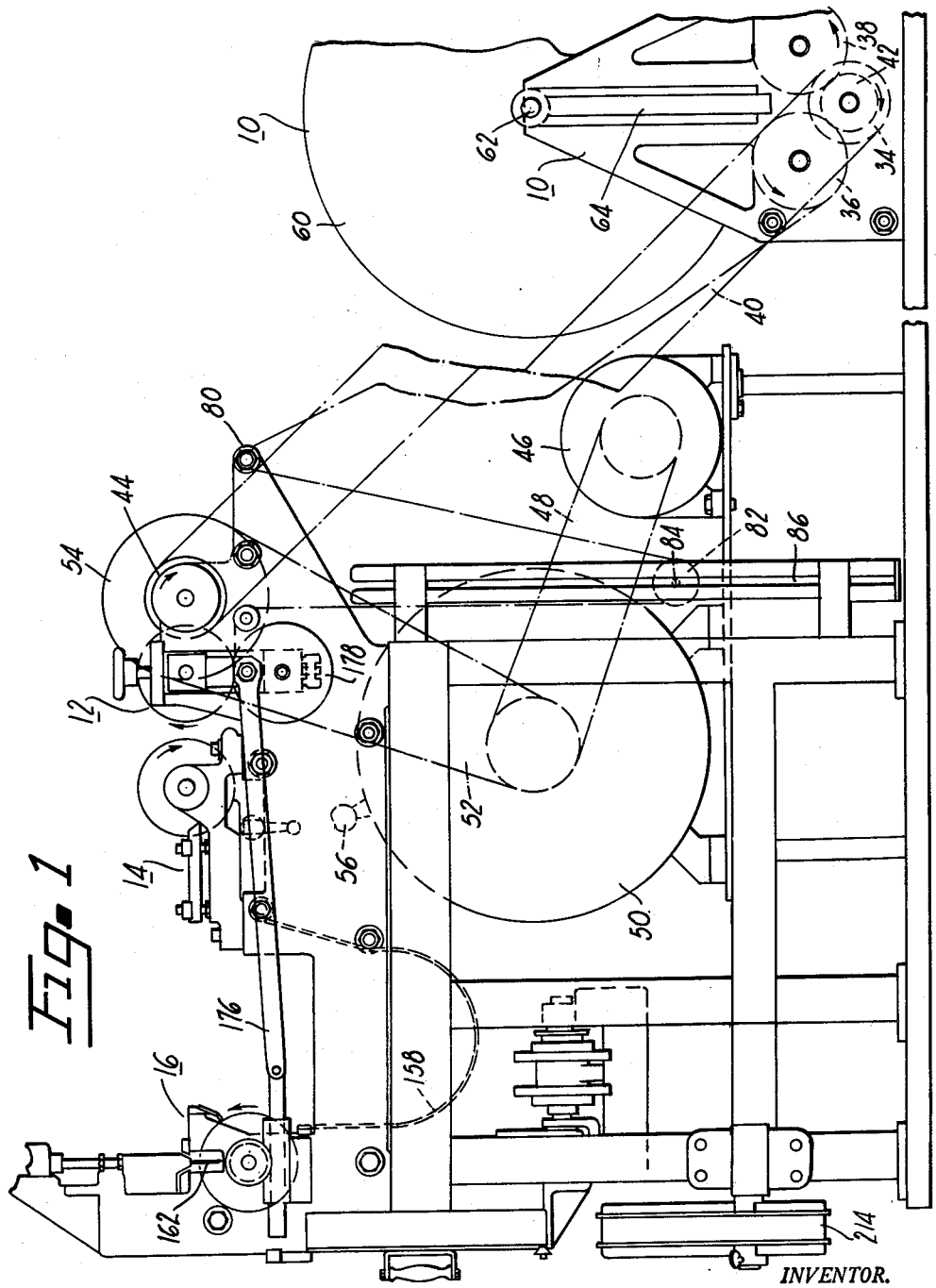
Figure 1 is a side elevation of my pleating, cutting and forming machine showing the material pleating and cutting mechanisms.
Figure 2:
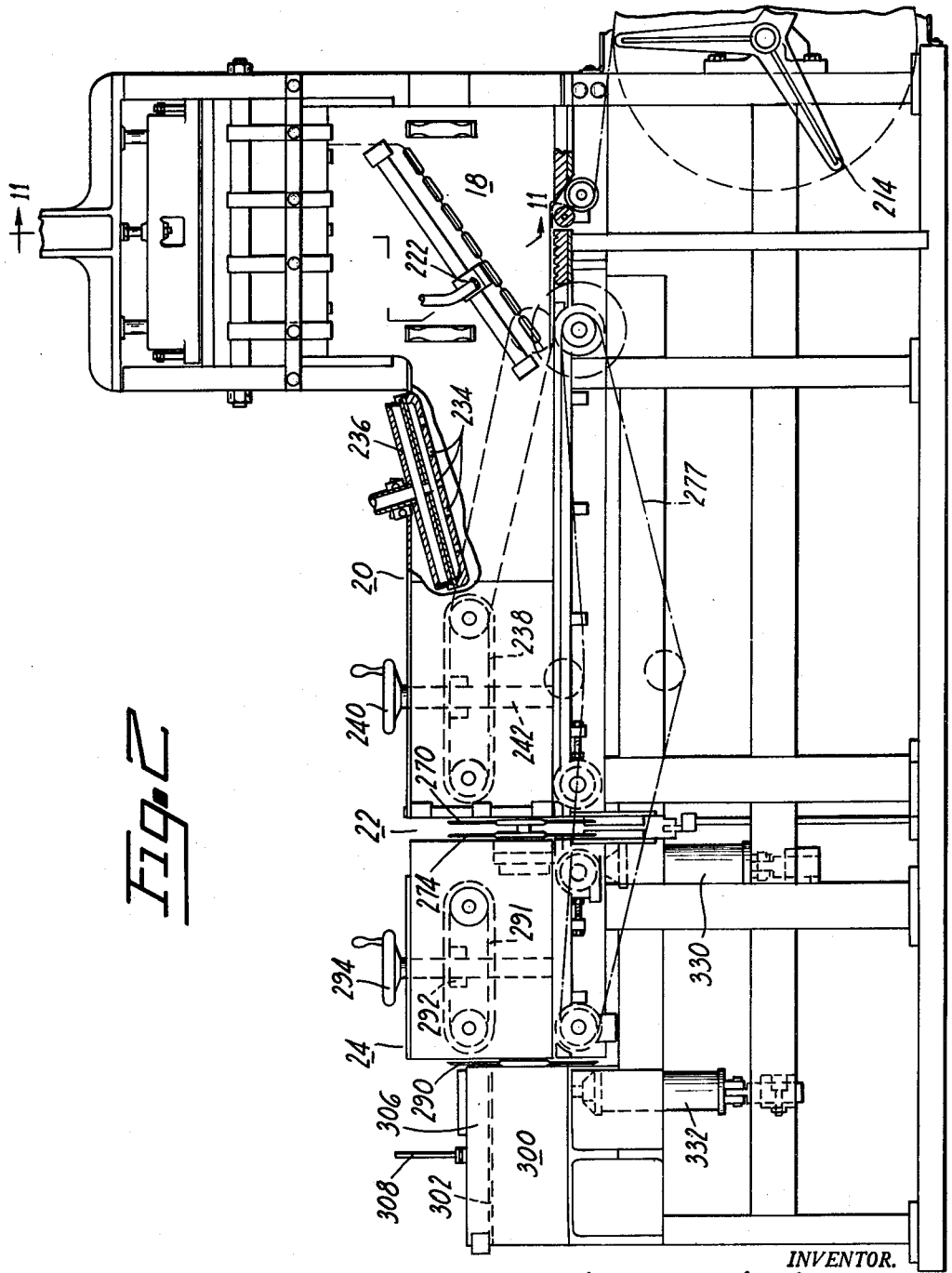
Figure 2 is a rear elevation of my machine showing the material cutting, forming and trimming mechanisms.

Referring now to the drawings, in which a preferred form of the present invention is shown and in which like reference numerals designate like parts throughout the several views, numeral 10 (Figure 1) denotes generally a reel for supporting a roll of material from which pleated articles are made, numeral 12 denotes a mechanism for creasing or crimping the material preparatory to pleating, numeral 14 a device in which the pleating operation is performed, 16 a mechanism for counting the pleats and severing the pleated material at predetermined intervals, 18 (Figure 2) a mechanism for forming the severed pleated sections into hollow articles, and 20, 22 and 24 article compressing, trimming and cutting mechanisms, respectively, the details of which will be more fully described hereinafter.

Figure 8:
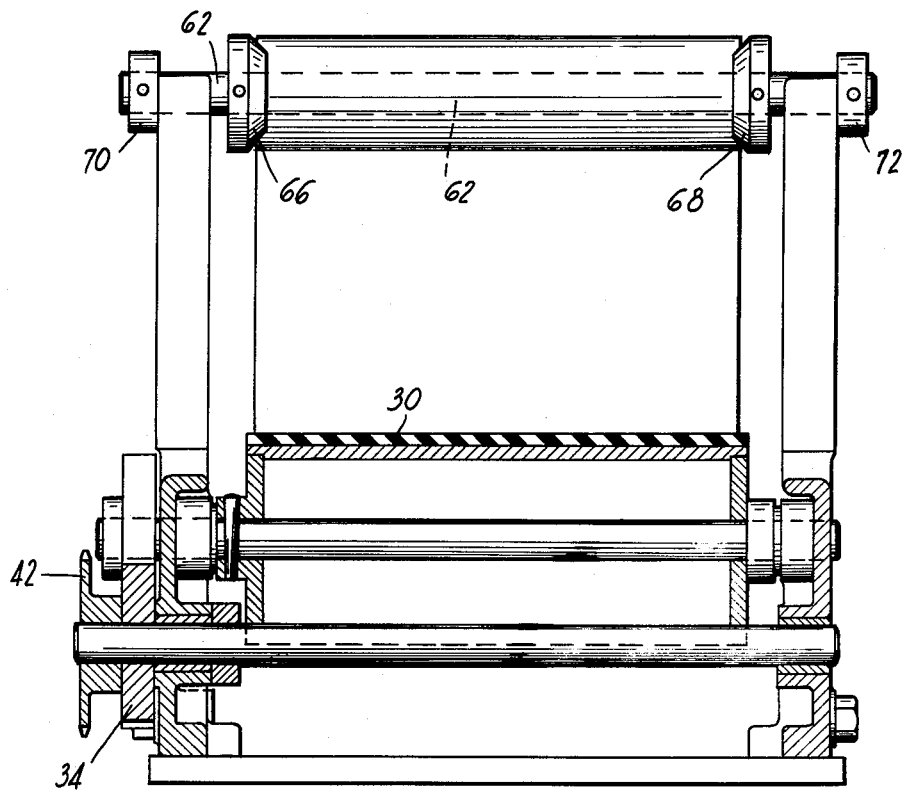
Figure 8 is another sectional view of the reel shown in Figure 7.

For the purpose of the present invention, reel 10 may be considered a conventional material handling means for feeding sheet material, such as paper, to the creasing mechanism at a predetermined constant rate. As shown in the drawings, especially in Figures 1, 7 and 8, the reel consists of two parallel rubber surfaced rolls 30 and 32 driven in unison through gears 34, 36 and 38 at a constant speed by a chain 40 and sprockets 42 and 44 on the reel and pleating machine, respectively. An electric motor 46 for driving the pleating machine is shown mounted on the machine frame and, through belt 48, drives a speed reducer 50 which in turn drives a belt 52, pulley 54 and sprocket 44. The rate of speed may be varied to suit requirements by shifting the position of lever 56 on the reducer 50. A roll of material 60, such as paper, rests on rollers 30 and 32 and is centered thereon by a shaft 62 extending through the center of the roll into slots 64 in the reel frame at each end of the roll. Shaft 62 is adapted to move downwardly in said slots as the roll becomes smaller and to rotate freely as the roll revolves. The roll is centered laterally in the reel by oppositely disposed cones 66 and 68 and collars 70 and 72, all mounted on shaft 62 and rigidly secured in operative position by suitable pins or set screws.

As the sheet uncoils, it passes over a fixed roller 80 and under a vertically movable idle roller 82 which is adapted to ride on the sheet and take up the slack to provide a constant amount of tension on the sheet entering crimping mechanism. Pins 84 in the ends of the roller 82 and axially aligned therewith ride in vertical slots 86 at each end of the roller and guide the roller throughout its vertical range of movement.

Figure 5:
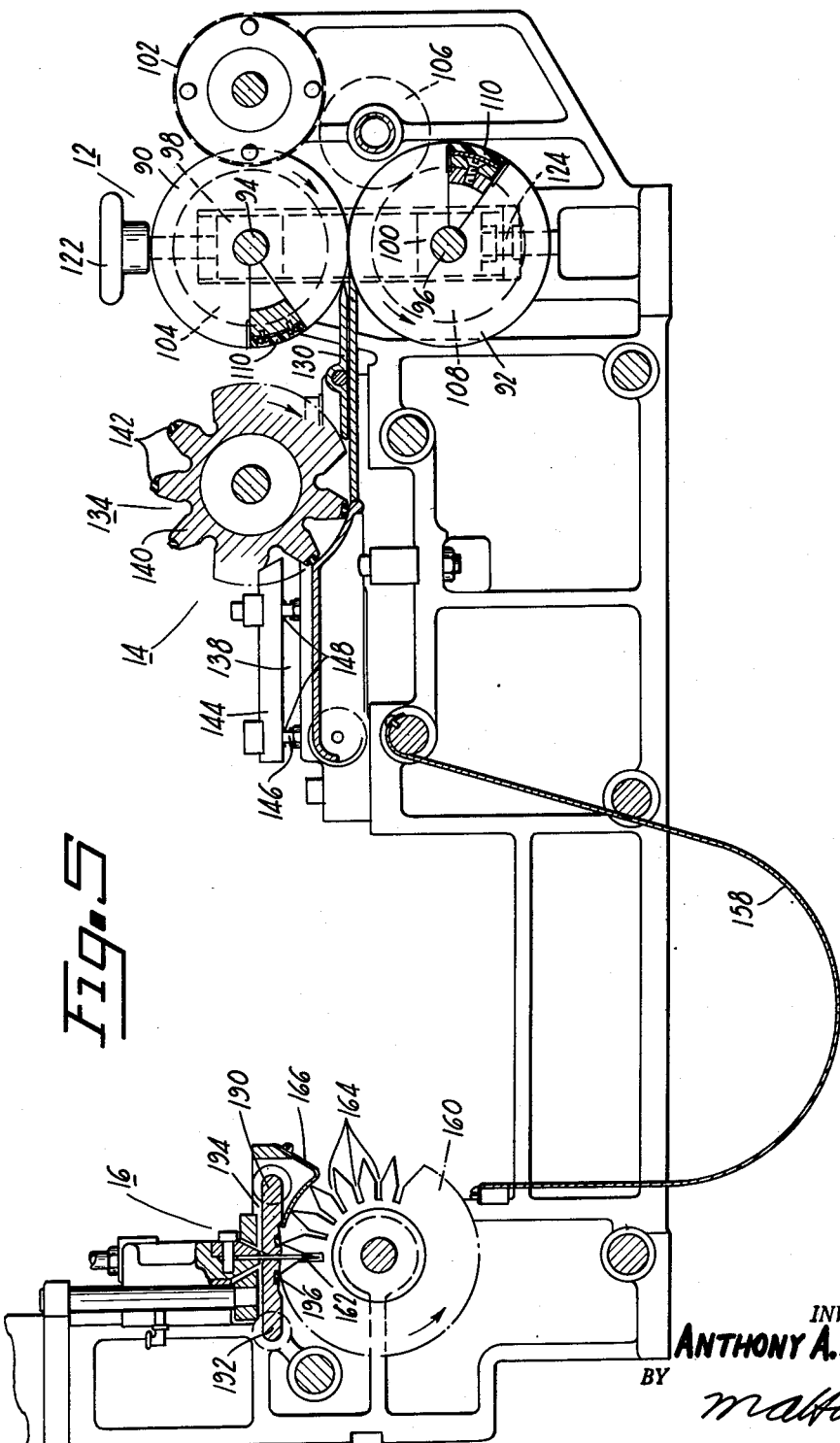
Figure 5 is an enlarged view of the machine as shown in Figure 1 with portions of the mechanisms shown in cross-section.

The material crimping mechanism 12, best shown in Figures 5 and 9, includes two coacting rollers 90 and 92 mounted on shafts 94 and 96, respectively, in bearings 98 and 100 and driven in unison by gear 102 through gear 104 to roller 90 and through gears 106 and 108 to roller 92. Rollers 90 and 92, which are identical in construction and which are shown in Figure 9 in section taken on different planes, are provided with a thick rubber or rubberlike layer or coating 110 formed in longitudinal segments and cemented to arcuate metal strips or segments 112 which are secured to the body of the roller by screws 116. Disposed between each segment is a crimping blade 118 rigidly secured in place between the rubber segments by arcuate metal inserts 114 secured to the body of the roller by screws 120. The outside edge of the blades project slightly beyond the periphery of the rollers and are tapered to an edge having only sufficient sharpness to crease the material without cutting, tearing, or otherwise damaging the surface of the material. As shown in Figure 9, the outside edge of the blades depress the surface of the rubber segments of the opposing roller at the point of contact and, in the crimping operation, the sheet material passing between the rollers is creased each time a blade passes between the rollers, the blades of the lower roller 92 producing an upwardly extending crease and the blades of the upper roller 90 producing a downwardly extending crease. The rollers are so arranged in relation to one another that the blades of one contact the rubber coating 110 half-way between the blades of the other roller so that the pleats thereafter formed from these creases will be uniform in size. The pressure exerted by the blades on the material and the size of the crease can be adjusted by a screw 122 disposed at each end of roller 90 adapted to move bearing 98 and said roller in a vertical direction. Only slight movement of roller 90 is required to make an adjustment. An adjustment screw 124 is also provided for bearing 100 for making the initial adjustment of roller 92.

As the crimped material emerges from the crimping rollers, it passes through a guide 130 to a gathering roller or wheel 134 which moves the material into a restricted passage 138 wherein the material is folded at the aforementioned creases into full pleats. The roller 134 consists of several equally spaced spokes or fingers 140 extending the full length of said roller and having soft rubber caps 142 for frictionally engaging the material during the rotation of the roller. The movement of the material in passage 138 is resisted by a weighted bar 144 mounted on studs 146 and supported thereon by calibrated springs 148 which determine the amount of pressure exerted by said bar on the material. The resistance applied to the material by bar 144 causes the material to fold on itself into pleats along the lines on which the material was creased by the crimping rollers.

Figure 3:
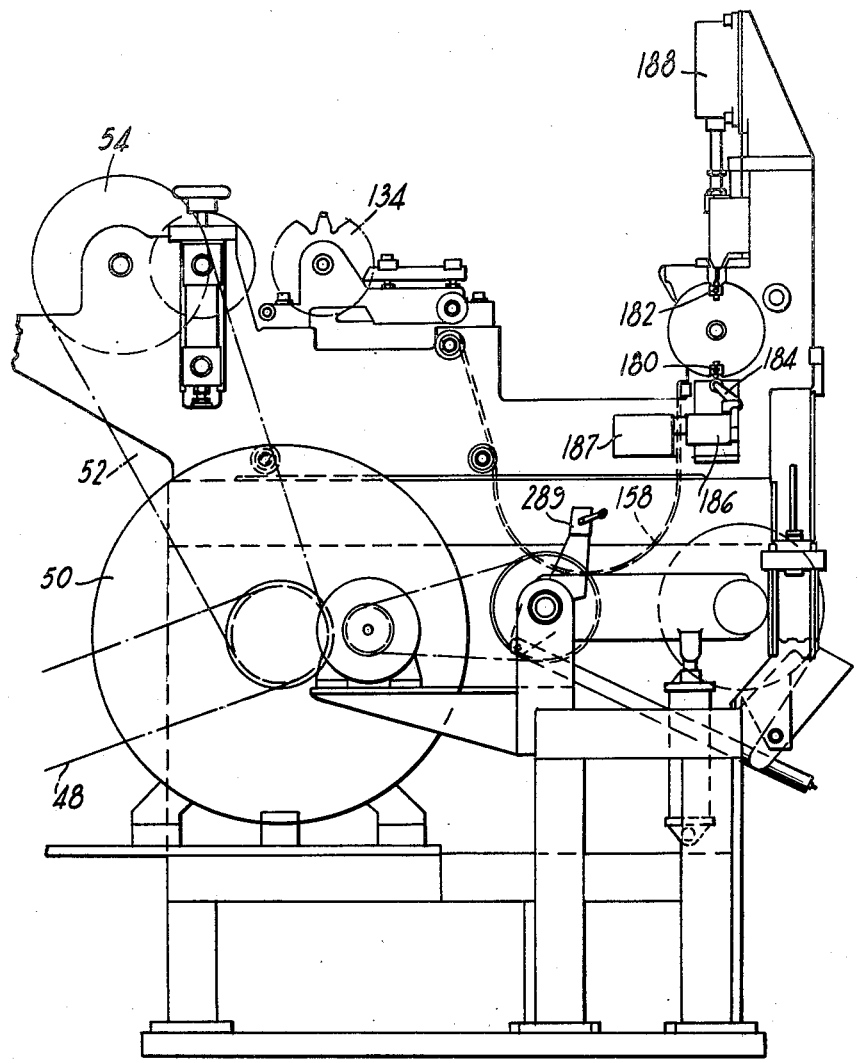
Figure 3 is an elevation of my machine showing the opposite side from that shown in Figure 1.

The pleated material which moves through the passage 138 as a rather compact folded mass, emerges from the passage and drops down into a U-shaped chute 158 which connects said passage with the counting and cutting mechanism 16 consisting generally of an intermittently movable wheel 160 and a reciprocating blade 162. Wheel 160 contains a plurality of equally spaced longitudinal grooves 164 into which the pleats of the material are pressed by a stationary finger 166 as said wheel rotates. Wheel 160 is rotated by an over-running clutch 170, a rack 172 and a pinion 174, such as that shown in Figure 10, driven by a rod 176 (Figure 1) from a wheel 178 mounted on and rotated by shaft 96 of crimping roller 92. Wheel 160 rotates during one-half revolution of wheel 178 and remains at rest during the other half revolution of wheel 178. By this arrangement, the movement of wheel 160 is synchronized with the operation of the material crimping mechanism. In the machine shown in the drawings, one revolution of the wheel 178 rotates wheel 160 one-half revolution, placing the center of a groove directly beneath the cutting blade. The material may be severed at the end of each stroke, that is, at each half revolution of wheel 160 or at the end of any multiple thereof. As the wheel is indexed to the cutting position, one of two lugs 180 and 182 (Figure 3), on said wheel trips a lever 184 of a limit switch 186 which operates a counter, shown schematically at 187, which in turn energizes a solenoid actuated valve in an air line to a pneumatic cylinder 188 for operating blade 162. The counter may be regulated to operate the air valve only after lever 184 of switch 186 has been tripped by lugs 180 and 182 a predetermined number of times, thus making it possible to select sections of material of any desired length in multiples of one-half the circumference of wheel 160. As blade 162 moves downwardly in the first portion of the cutting stroke, two pivoted members 190 and 192 of a clamping element 194 move downwardly against the material on the end of the two fingers at each side of the groove in the cutting station to prevent the material from slipping during the cutting operation. Each member 190 and 192 of the clamping element is provided with a rubber insert 196 at the points at which the element contacts the material on wheel 160 to prevent damage to the material clamped between said members and wheel 160. As the blade is withdrawn after the cutting operation, the clamping element retracts, freeing the material and wheel 160 for further movement. A suitable locating element which may consist of a plurality of slots in wheel 160 and a reciprocating finger operated in unison with the blade 162 is preferably included to align the grooves with the cutting blade and to prevent the wheel from rotating during the cutting operation.

Figure 12:
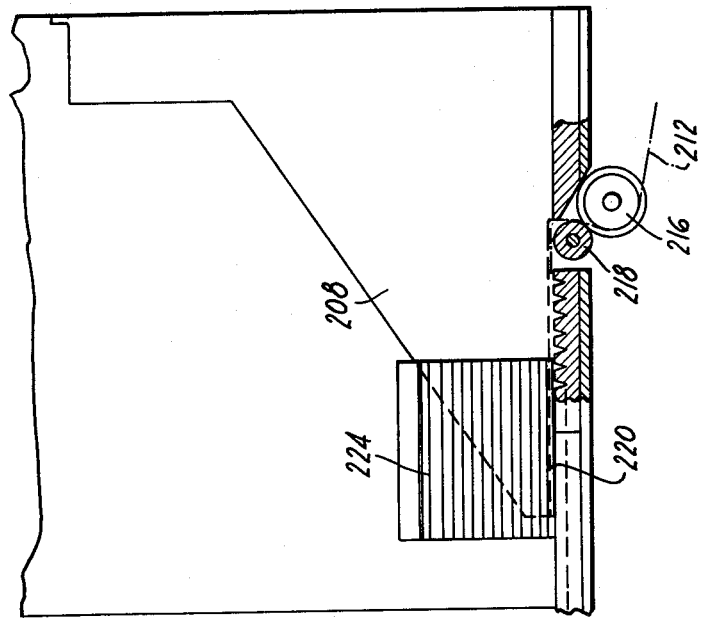
Figure 12 is a partial section through another portion of the same article forming mechanism shown in Figure 11.
Figure 11:
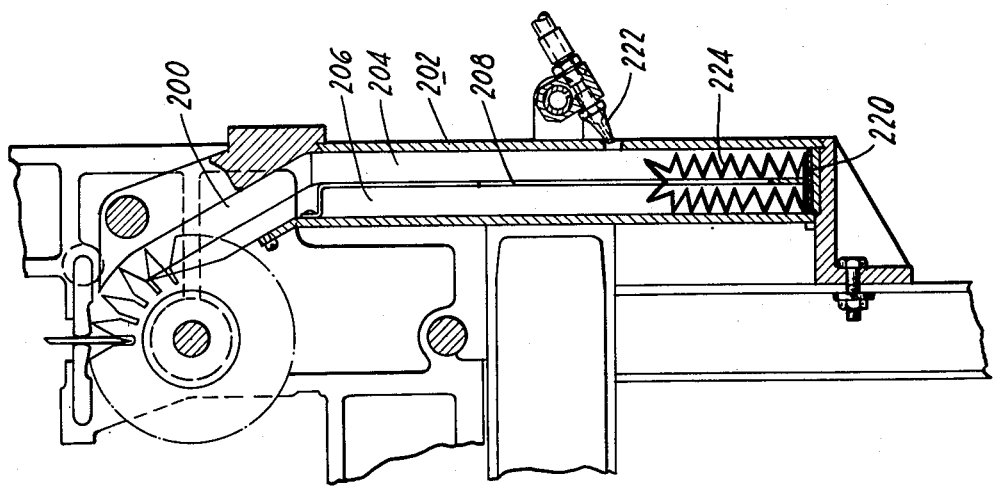
Figure 11 is a vertical section through a portion of the article forming mechanism.

After the material has been severed, further rotation of wheel 160 permits the severed section to fall from said wheel down an inclined chute 200 (Figure 11) into a vertically arranged chamber 202 which is subdivided into two equal vertical compartments 204 and 206 by a partition 208. The upper edge of said partition extends diagonally from the lower left hand side of chamber 202, as shown in Figure 12, to the upper half on the right hand side. A ribbon of adhesive material 212 is fed into the bottom of chamber 202 from a reel 214, first passing under a roller 216, then over a roller 218 into a slot 220 beneath the left-hand end of partition 208. On leaving chute 200, the severed section of pleated material falls to the bottom of compartment 204 and the upper half thereof is blown by a blast of air from a nozzle 222 over the diagonally extending edge of partition 208 so that said pleated material assumes an inverted U-shaped position, as shown at 224 in Figure 11, one end being in compartment 204 and the other end in compartment 206, and the ends of said U-shaped section contacting and adhering to said adhesive ribbon in the bottom of each compartment. Material as wide as the diagonally extending edge of partition 208 is long may be used satisfactorily in the present machine.

The inverted U-shaped section and the adhesive ribbon adhering to the ends thereof are carried by a conveyor 230 (Figure 6) through a compartment 232 which is only wide enough to accommodate the U-shaped pleated section. As the pleated section advances through this compartment, a plurality of air jets 234 disposed in an adjustable air tube 236 direct small streams of air on the top side of the U-shaped section to compress said section sufficiently to permit it to pass beneath conveyor 238 which is so adjusted that the U-shaped section is retained in a rather tightly compressed pack and is pressed tightly against the adhesive side of tape 212 resting on conveyor 230, causing said tape and section to become securely joined to one another. The position of conveyor 238 may be adjusted relative to conveyor 230 to accommodate various sized pleated sections, i. e. sections having different numbers of pleats, by rotating a hand wheel 240 and screw 242. Conveyors 230 and 238 are driven in unison by an interconnecting chain 250 on sprockets 252 and 254, the latter sprocket being operatively connected to the sprocket of conveyor chain 230, as will be more fully explained hereinafter. The conveyors are driven by a pneumatic cylinder 256 through a rack 258 and a pinion and clutch arrangement such as that shown in Figure 15. This pneumatic mechanism receives a delayed starting impulse from the limit switch 186 of the pleat counting element and moves the conveyor forward a predetermined distance, i. e. approximately the length of the completed article or a multiple of said length.

The article advances intermittently along conveyor 230 and moves into a position at which the leading end of the article is trimmed by a circular power driven knife 270 adapted to oscillate in and out of cutting position in timed relation with the intermittent movement of the articles along conveyor 230. After the leading end of the article has been trimmed, the article is advanced by conveyor 230 and by another conveyor 272 to the position at which the trailing end of the article is trimmed by another circular power driven knife 274 similar to knife 270, both of which are mounted on a common shaft 276 and adapted to be moved relatively to one another on said shaft for making adjustments in the length of the final article. Both the leading end of one stack and the trailing end of the following stack are trimmed simultaneously by one pass of knives 270 and 274.

Conveyor 272 is driven by a chain 277 (Figure 2) from the same drive as that for conveyor 230. Referring to Figure 15, the rack 258 rotates a pinion 278 and through an overrunning clutch or ratchet shown schematically at 279, intermittently rotates the sprocket 280 for chain 277, said pinion and sprocket being freely rotatable on shaft 281. For each operation of cylinder 256, chain 277 advances conveyor 272 a predetermined distance. Conveyor 230 is driven by the pneumatic cylinder 256 through rack 258, pinion 278, overrunning clutch 279, an electrically controlled clutch 282 and a sprocket 283 secured to shaft 281. Two intermeshing gears 284 and 285 operatively secured to sprockets 254 and 283, respectively, synchronize the movement of conveyors 230 and 238. A solenoid 286 operates a lever 287 to disengage the two opposing members of clutch 282, one member of said clutch being secured to sprocket 280 which freely rotates on shaft 281 and the other member of the clutch being keyed to said shaft and adapted to be moved axially thereon in the declutching direction by solenoid 286 through lever 287 and in the clutch engaging direction by a spring 288.

As the circular knives are retracted, a limit switch and control means shown schematically at 289 (Figures 3 and 4) are energized, actuating cylinder 256 and simultaneously energizing the solenoid 286 which operates lever 287 to disengage the opposing members of clutch 282 so that conveyor 230 is temporarily rendered inoperative. Conveyor 272, continuing to be operated by cylinder 256 through rack 258, pinion 278, overrunning clutch 279, sprocket 280, and the chain 277, moves the trimmed articles to a cut-off station at which a circular power knife 290 cuts the articles into any desired length as determined by the distance the articles are moved by each operation of the cylinder 256. After the control means 289 has been actuated a predetermined number of times, solenoid 286 is de-energized and clutch 282 again becomes effective to actuate conveyor 230. A conveyor 291 similar to conveyor 238 is provided above conveyor 272 to maintain the pleated articles in their compressed position throughout the article advancing and cutting operation. Conveyor 291 may be adjusted relative to conveyor 272 by rotating a screw 292 through hand wheel 294.

The articles, after being cut into the desired lengths by knife 290, pass through a chute 300 and are maintained in their compressed position by a bar 302 pivoted at one end at 304 and weighted at the other end with a block of metal 306 such as lead. The limit of the downward movement of bar 302 is adjusted by a device consisting of a nut threadedly received on a rod 308 which is pivotally connected to said bar and positioned between the tines of a bifurcated support 310, the nut being adapted to seat on the top side of said support and retain said bar in the desired position. The articles are pushed through chute 300 by the oncoming articles discharged from conveyor 272.

Figure 4:
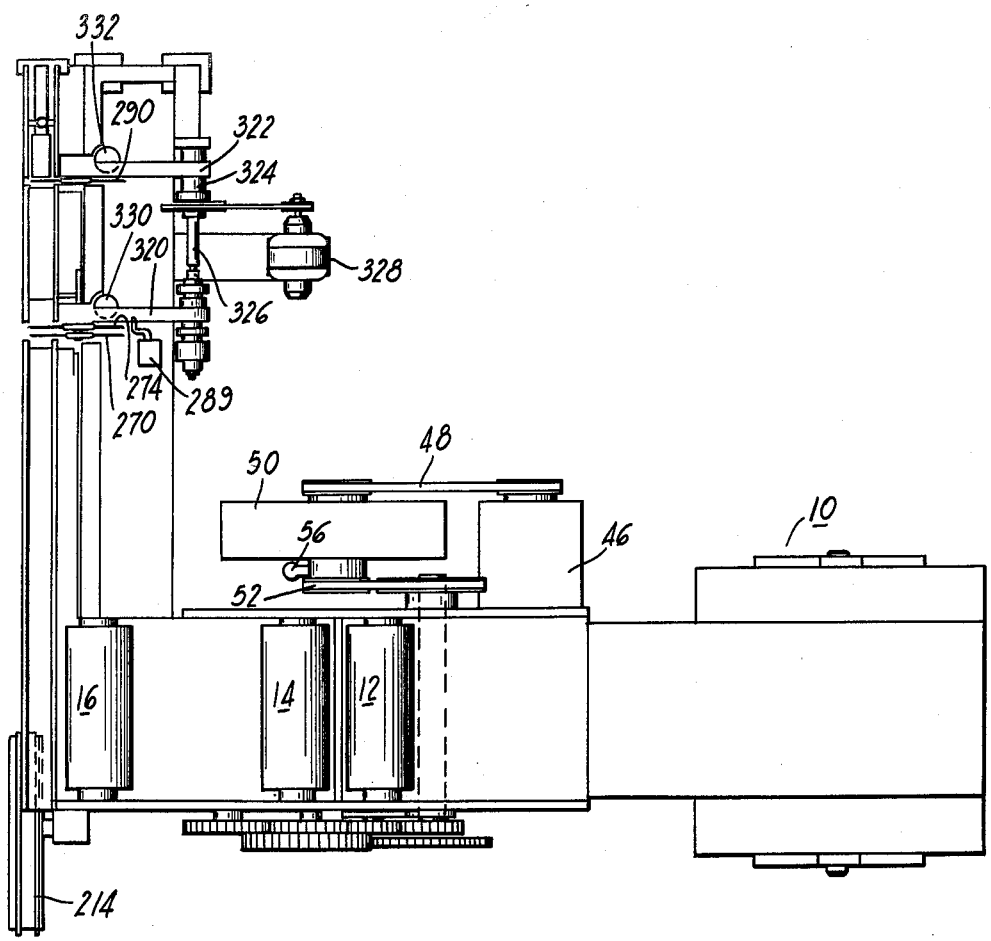
Figure 4 is a top plan view of the machine, the several elements thereof being shown schematically.

The details of the circular power driven knives are best shown in Figure 14, which shows a side elevation, and Figure 4, which shows a top plan view of the knives along with the rest of the machine. Knives 270 and 274 are supported by a pivoted arm 320 in which the drive for said knives is located, and knife 298 is supported by another pivoted arm 322 which contains the drive for that knife. Arms 320 and 322 are pivoted on a horizontal shaft 324 in which is disposed a rotatable shaft 326 for transmitting the power from a motor 328 to the three knives. The knives 270 and 274 and knife 298 are moved into and out of cutting position by pneumatic cylinders 330 and 332 (Figure 2), respectively, the movement of which is synchronized by any suitable control means with the movement of the conveyors and with the operation of cutting blade 162. The upward movement of arms 320 and 322 and their respective knives is limited by an arrangement of levers, consisting of (only the levers for arm 322 being described since the arrangement of levers for both arms is identical) a pivoted lever 334 rigidly secured to lever 322, a lever 336 pivoted at 338 and a member 340 pivotally connected to levers 334 and 336. The movement of these levers, together with the upward movement of the cutting knives, is limited by a stop screw 342 which is adapted to abut against a support 344 for lever 336.

In the operation of the present material pleating, cutting and forming machine, a roll of material for pleating, such as paper for pleated filter elements, is mounted in reel 10 on rollers 30 and 32, shaft 62 is inserted through the central opening of the roll and cones 66 and 68 are placed in the ends thereof for maintaining the roll in proper alignment with the crimping rollers. As the sheet material unwinds, it passes over roller 80 and under roller 82 to the material crimping mechanism 12 wherein the material is creased at uniform intervals alternately in upwardly extending and downwardly extending creases. The material, on leaving the crimping rolls, passes through a chute 130 which maintains the crimped material in a substantially flat position and delivers said material to the gathering roll 134 which moves the paper in an upwardly direction into passage 138 where a weighted bar resists the movement of the material, causing it to fold along the creases formed by the crimping rolls into well defined pleats. The pleated material is urged through passage 138 by the oncoming material fed into said passage by gathering roll 134. On leaving the passage, the pleated material falls into U-shaped chute 158 and passes in a rather loosely folded condition to the counting and cutting mechanism 16 wherein the pleats are forced into grooves 164 of wheel 160 by finger 166 as said wheel is rotated. At every half revolution of wheel 160 or multiple thereof, limit switch 186 and counter 187 energize the pneumatic cylinder 188 which actuates cutting blade 162 to sever a section of pleated material from the roll. On further rotation of wheel 160, the severed section falls into compartment 204 of chamber 202 and the upper end of the pleated section is blown over partition 208 into compartment 206, the ends of said severed section falling onto the adhesive tape on the bottom of compartments 204 and 206.

The U-shaped section and tape are carried by conveyor 230 through compartment 232, first passing under a multiple air jet 236 which compresses the U-shaped article sufficiently to permit it to pass under conveyor belt 238. The article held in this compressed position moves intermittently through compartment 232 to circular power driven knife 270, where the forward end of said article is trimmed as said knife is moved downwardly by pneumatic cylinder 330. After the forward end is trimmed, knife 270 is retracted and the article advances onto conveyor 272, and the trailing end thereof is trimmed by knife 274. The knives 274 and 270, on retracting, energize control means 289 which actuates cylinder 256 and energizes solenoid 286, the latter operating lever 287 to render conveyor 230 inoperative while permitting conveyor 272 to continue to operate. While conveyor 230 is inoperative, pneumatic cylinder 250 advances conveyor 272 a preselected number of steps, the length of which determines the final length of the article. After each step of conveyor 272, the article is cut by circular power driven knife 290 into its final length, then pushed through chute 300 and discharged at the left-hand end thereof, as drawn in Figure 6. After a predetermined number of steps have been completed by conveyor 272, control means 289 de-energizes solenoid 286, permitting conveyor 230 to be actuated by cylinder 256 in response to the operation of switch 186.

From the foregoing, it is seen that the machine performs the operation of creasing and pleating sheet material, cutting the pleated material into predetermined lengths, folding the pleated material into hollow articles, trimming the articles, and then cutting them into the desired length, the steps all being performed in one continuous operation.

Although only one embodiment of my machine has been shown and described herein, it is understood that many modifications may be made in the several mechanisms, and steps comprising the machine and method, respectively, and in the arrangements of these mechanisms and steps in relation to one another, without departing from the scope of my invention. Further, to satisfy requirements under certain circumstances and operating conditions, one or more of the individual mechanisms or steps may be omitted or other mechanisms or steps may be included.

I claim:

1. A machine for fabricating articles from sheet material comprising a mechanism for crimping said material alternately into oppositely extending creases; a mechanism for folding the material along said creases into well defined pleats; a mechanism for severing said material into sections having a predetermined number of pleats; a mechanism for joining together the two ends of each section parallel with the pleats thereof to form hollow articles; and a mechanism for trimming the ends of said articles and cutting said articles into desired lengths.

2. A machine for fabricating articles from sheet material comprising a mechanism for crimping said material alternately into oppositely extending creases; a mechanism for folding the material along said creases into well defined pleats; a mechanism for severing said material into sections having a predetermined number of pleats; a mechanism for joining together the two ends of each section parallel with the pleats thereof to form hollow articles; a pneumatic means for compressing said hollow articles; and a conveyor mechanism for delivering said articles in their compressed condition to a mechanism for trimming the ends of said articles and cutting said articles into desired lengths.

3. A machine for fabricating articles from sheet material comprising a reel for supporting a coil of sheet material; a mechanism for crimping said material at uniform intervals alternately into oppositely extending creases; a mechanism for folding the material along said creases into well defined pleats; a mechanism for severing said material into sections having a predetermined number of pleats; a mechanism for joining together the two ends of each section parallel with the pleats thereof to form hollow articles; a pneumatic means for compressing said articles; and a conveyor mechanism for delivering said hollow articles in their compressed condition to a mechanism for trimming the ends of said articles and cutting them into desired lengths.

4. A machine for fabricating articles from sheet material comprising a pair of coacting rolls having resilient surfaces and longitudinally arranged blades uniformly distributed around the periphery of the rolls for crimping the sheet material alternately into oppositely extending creases as said material passes between said rolls, the blades of one roll being adapted to contact the surface of the other roll substantially midway between the blades; a restricted passageway for said crimped material adapted to offer resistance to the movement of the material therethrough; a wheel interposed between said rolls and said passageway for feeding the crimped material into the passageway and thereby causing the material to fold along said creases into well defined pleats; a mechanism for severing said material into sections having a predetermined number of pleats; and a mechanism for joining together the two ends of each section parallel with the pleats thereof to form hollow articles.

5. A mechanism for fabricating articles from sheet material comprising a pair of coacting rolls having resilient surfaces and longitudinally arranged blades uniformly distributed around the periphery of said rolls for crimping the sheet material alternately in oppositely extending creases, the space between the blades of one roll being the same as the space between the blades of the other roll; a restricted passageway for said crimped material adapted to offer resistance to the movement of the material therethrough; a wheel interposed between said rolls and said passageway for feeding the crimped material into the passageway and thereby causing the material to fold along said creases into well defined pleats; a mechanism for severing said material into sections having a predetermined number of pleats; a mechanism for joining together the two ends of each section parallel with the pleats thereof to form hollow articles; a pneumatic means for compressing said hollow articles; and a conveyor mechanism for delivering said articles in their compressed condition to a mechanism for trimming the ends of said articles and for cutting said articles into desired lengths.

6. A machine for fabricating articles from sheet material comprising a pair of coacting rolls having resilient surfaces and longitudinally arranged blades uniformly distributed around the periphery of the rolls for crimping the sheet material alternately in oppositely extending creases; a restricted passageway for said crimped material adapted to offer resistance to the movement of the material therethrough; a wheel interposed between said rolls and said passageway for feeding the crimped material into the passageway and thereby causing the material to fold along said creases into well defined pleats; an intermittently rotatable wheel having longitudinally arranged grooves uniformly spaced around said wheel, each groove being adapted to receive a single pleat; and a cutting blade adapted to move into one of said grooves when said intermittently rotatable wheel is at rest to sever a section of pleated material.

7. A mechanism for fabricating articles from sheet material comprising a pair of coacting rolls having resilient surfaces and longitudinally arranged blades uniformly distributed around the periphery of the rolls for crimping the sheet material alternately into oppositely extending creases as said material passes between said rolls, the blades of one roll being adapted to contact the surface of the other roll substantially midway between the blades; a restricted passageway for said crimped material adapted to offer resistance to the movement of the material therethrough; a wheel interposed between said rolls and said passageway for feeding the crimped material into the passageway and thereby causing the material to fold along said creases into well defined pleats; a second wheel having longitudinally arranged grooves uniformly spaced around said wheel, each groove being adapted to receive a single pleat; a mechanism adapted to rotate said second wheel intermittently in timed relation with the crimping rolls; and a cutting blade adapted to move into one of said grooves when said second wheel is at rest to sever a section of pleated material.

8. A machine for fabricating articles from sheet material comprising a material supply means; a pair of coacting rolls having resilient surfaces and longitudinally arranged blades uniformly distributed around the periphery of the rolls for crimping the sheet material alternately into oppositely extending creases; a mechanism for folding the material along said creases into well defined pleats; a wheel having longitudinally arranged grooves uniformly spaced around said wheel, each groove being adapted to receive a single pleat; a mechanism adapted to rotate said wheel intermittently in timed relation with the crimping rolls; a finger for urging the pleats into said grooves as said wheel rotates; a cutting blade adapted to move into one of said grooves when said wheel is at rest to sever a section of pleated material; and a means for removing the pleats of the severed section from the grooves of said wheel.

9. A machine for fabricating articles from sheet material comprising a pair of coacting rolls having resilient surfaces and longitudinally arranged blades uniformly distributed around the periphery of the rolls for crimping the sheet material alternately into upwardly and downwardly extending creases; a restricted passageway for said crimped material adapted to offer resistance to the movement of the material therethrough; a wheel interposed between said rolls and said passageway for feeding the crimped material into the passageway and thereby causing the material to fold along said creases into well defined pleats; and intermittently rotatable wheel having longitudinally arranged grooves uniformly spaced around said wheel, each groove being adapted to receive a single pleat; a cutting blade adapted to move into one of said grooves when said intermittently rotatable wheel is at rest to sever a section of pleated material; a chamber divided into halves by a vertical partition extending only part way to the top of said chamber; a means for delivering the severed section of pleated material from the intermittently rotatable wheel to one side of said chamber; an air jet adapted to blow the upper half of said section over said partition to form a U-shaped member; a trimming knife adapted to oscillate into and out of trimming position; a pneumatic means for compressing the U-shaped member; and a conveyor connecting one end of said chamber with said trimming knife to deliver said member in its compressed condition to said knife.

10. A machine for fabricating articles from sheet material comprising a pair of coacting rolls having resilient surfaces and longitudinally arranged blades uniformly distributed around the periphery of the rolls for crimping the sheet material alternately into upwardly and downwardly extending creases; a restricted passageway for said crimped material adapted to offer resistance to the movement of the material therethrough; a wheel interposed between said rolls and said passageway for feeding the crimped material into the passageway and thereby causing the material to fold along said creases into well defined pleats; a second wheel having longitudinally arranged grooves uniformly spaced around said wheel, each groove being adapted to receive a single pleat; a mechanism adapted to rotate said second wheel intermittently in timed relation with the crimping rolls; a cutting blade adapted to move into one of said grooves when said second wheel is at rest to sever a section of pleated material; a chamber divided into halves by a vertical partition extending only part way to the top of said chamber; a channel in the bottom of said chamber for receiving a ribbon of adhesive material; a chute for delivering the severed sections of pleated material from the second wheel to one side of said chamber; an air jet adapted to blow the upper half of said sections over said partition to form U-shaped members, the bottom edge of said members adhering to said ribbon; a trimming knife adapted to oscillate into and out of trimming position; a pneumatic means for compressing said members; and a conveyor connecting one end of said chamber with said trimming knife to deliver said U-shaped members in their compressed condition to said knife.

11. A machine for fabricating articles from sheet material comprising a mechanism for crimping said material alternately into upwardly and downwardly extending creases; a mechanism for folding the material along said creases into well defined pleats; a mechanism for severing said material into sections having a predetermined number of pleats; a chamber divided into halves by a vertical partition extending only part way to the top of said chamber; a chute for delivering the severed sections to one side of said chamber; an air jet adapted to blow the upper half of said sections over said partition to form U-shaped members; a trimming knife adapted to oscillate into and out of trimming position; a conveyor connecting one end of said chamber with said trimming knife to deliver said U-shaped members in their compressed condition to said knife; a knife for cutting said members into articles of predetermined lengths, said knife being adapted to oscillate into and out of cutting position; and a pneumatic means for driving said conveyor intermittently in timed relation with the movement of the material severing blade and trimming and cutting knives.

12. A machine for fabricating articles from sheet material comprising a mechanism for crimping said material at uniform intervals alternately into upwardly and downwardly extending creases; a mechanism for folding the material along said creases into well defined pleats; a mechanism for severing said material into sections having a predetermined number of pleats; a chamber divided into halves by a vertical partition extending only part way to the top of said chamber; a channel in the bottom of said chamber for receiving a ribbon of adhesive material; a chute for delivering the severed sections of pleated material to one side of said chamber; an air jet adapted to blow the upper half of said sections over said partition to form U-shaped members, the bottom edge of said members adhering to said ribbon; a trimming knife adapted to oscillate into and out of trimming position; a means for compressing said members; and a conveyor connecting one end of said chamber with said trimming knife to deliver said U-shaped members in their compressed condition to said knife.

13. A machine for fabricating articles from sheet material comprising a pair of coacting rolls having resilient surfaces and longitudinally arranged blades uniformly distributed around the periphery of the rolls for crimping the sheet material alternately into upwardly and downwardly extending creases as said material passes between said rolls, the blades of one roll being adapted to contact the surface of the other roll sobstantially midway between the blades; a restricted passageway for said crimped material adapted to offer resistance to the movement of the material therethrough; a wheel interposed between said rolls and said passageway for feeding the crimped material into the passageway and thereby causing the material to fold along said creases into well defined pleats; a second wheel having longitudinally arranged grooves uniformly spaced around said wheel, each groove being adapted to receive a single pleat; a mechanism adapted to rotate said second wheel intermittently in timed relation with the crimping rolls; a finger for urging the pleats into said grooves as said wheel rotates; a cutting blade adapted to move into one of said grooves when said second wheel is at rest to sever a section of pleated material; a means for removing the severed sections from the grooves of said wheel; a chamber divided into halves by a vertical partition extending only part way to the top of said chamber; a channel in the bottom of said chamber for receiving a ribbon of adhesive material; a chute for delivering the severed sections of pleated material from the second wheel to one side of said chamber; an air jet adapted to blow the upper half of said sections over said partition to form U-shaped members, the bottom edges of each member adhering to said ribbon; a circular trimming knife adapted to oscillate into and out of trimming position; a pneumatic means for compressing said members; a conveyor connecting one end of said chamber with said trimming knife to deliver said U-shaped members in their compressed condition to said knife; a circular knife for cutting said members into articles of predetermined lengths adapted to oscillate into and out of cutting position; a conveyor adapted to hold said members in their compressed condition and deliver them to said cutting knife; and a pneumatic means for driving said conveyors intermittently in timed relation with the movement of the material severing blade and trimming and cutting knives.

14. A device for severing pleated material into sections having a predetermined number of pleats comprising an intermittently rotatable wheel having longitudinally arranged grooves uniformly spaced around said wheel, each groove being adapted to receive a single pleat; a finger for urging the pleats into said grooves as said wheel rotates; and a cutting blade adapted to move into one of said grooves when said wheel is at rest to sever a section of pleated material.

15. A means for forming hollow articles from pleated material comprising a chamber divided into halves by a vertical partition extending only part way to the top of said chamber; a channel in the bottom of said chamber for receiving a ribbon of adhesive material; a means for delivering sections of pleated material to one side of said chamber; and an air jet adapted to blow the upper half of said sections over said partition to form U-shaped members, the bottom edges of said members adhering to said ribbon.

16. A means for forming hollow articles from pleated material comprising a chamber divided into halves by a vertical partition extending only part way to the top of said chamber; a channel in the bottom of said chamber for receiving a ribbon of adhesive material; a means for delivering sections of pleated material to one side of said chamber; an air jet adapted to blow the upper half of said sections over said partition to form U-shaped members, the bottom edges of said members adhering to said ribbon; a trimming knife adapted to oscillate into and out of trimming position; a pneumatic means for compressing said members; a conveyor connecting one end of said chamber with said trimming knife to deliver said U-shaped members in their compressed condition to said knife; a knife for cutting said members into articles of predetermined lengths adapted to oscillate into and out of cutting position; a conveyor adapted to hold said members in their compressed condition and to deliver them to said cutting knife; and a pneumatic means for driving said conveyors intermittently in timed relation with the movement of the trimming and cutting knives.

ANTHONY A. MUEHLING.

REFERENCES CITED

The following references are of record in the file of this patent:

UNITED STATES PATENTS

| Number | Name | Date |
|---|---|---|
| 227,350 | Deering | May 11, 1880 |
| 1,015,580 | Nichols | Jan. 23, 1912 |
| 1,182,296 | Morden | May 9, 1916 |
| 2,025,179 | Sandberg | Dec. 24, 1935 |
| 2,028,048 | D'Aubigne | Jan. 14, 1936 |
| 2,057,295 | Engel | Oct. 13, 1936 |
| 2,141,235 | Angeletti | Dec. 27, 1938 |